Jan. 2, 1940. R. R. WEDDELL 2,185,487
INSERTED BLADE CUTTER
Filed Dec. 18, 1936 2 Sheets-Sheet 1
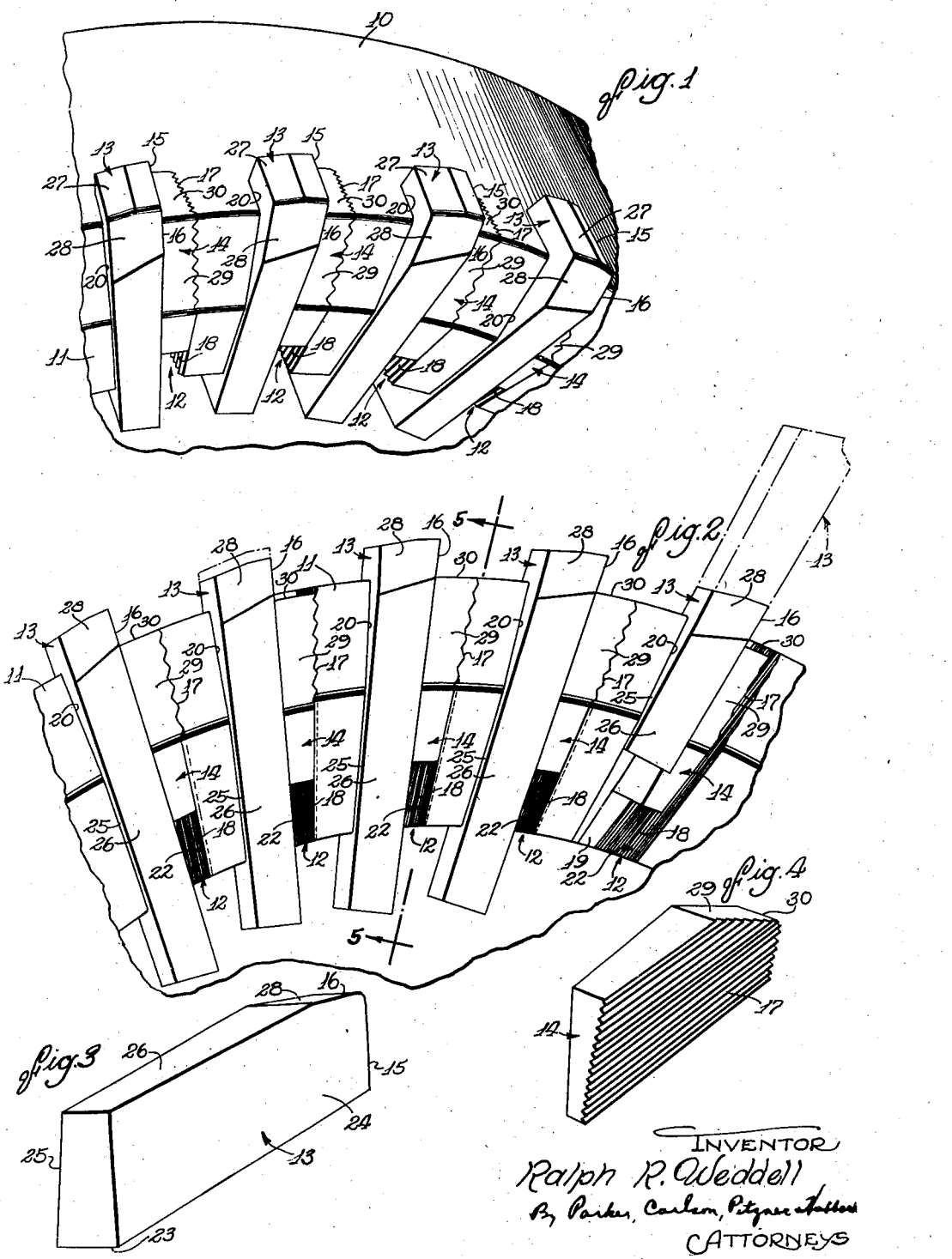

Jan. 2, 1940.  R. R. WEDDELL  2,185,487
INSERTED BLADE CUTTER
Filed Dec. 18, 1936   2 Sheets-Sheet 2
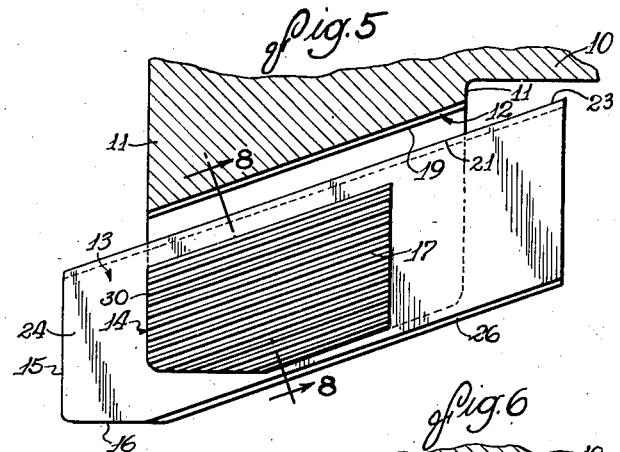
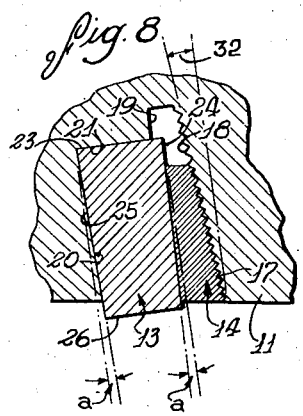
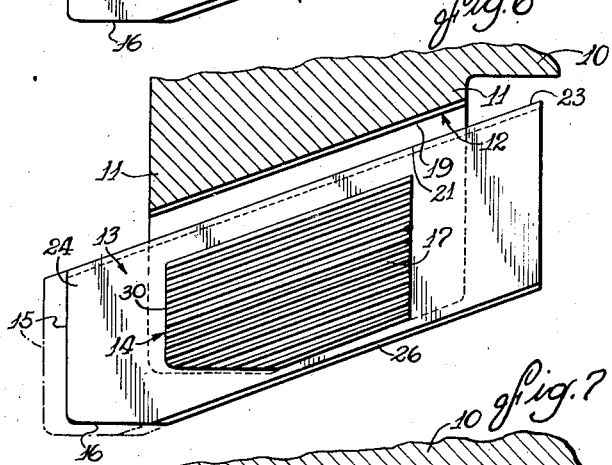
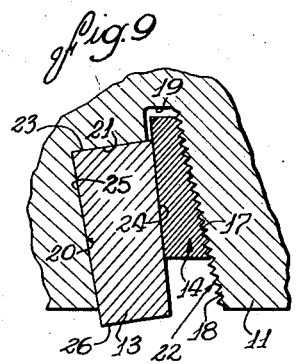
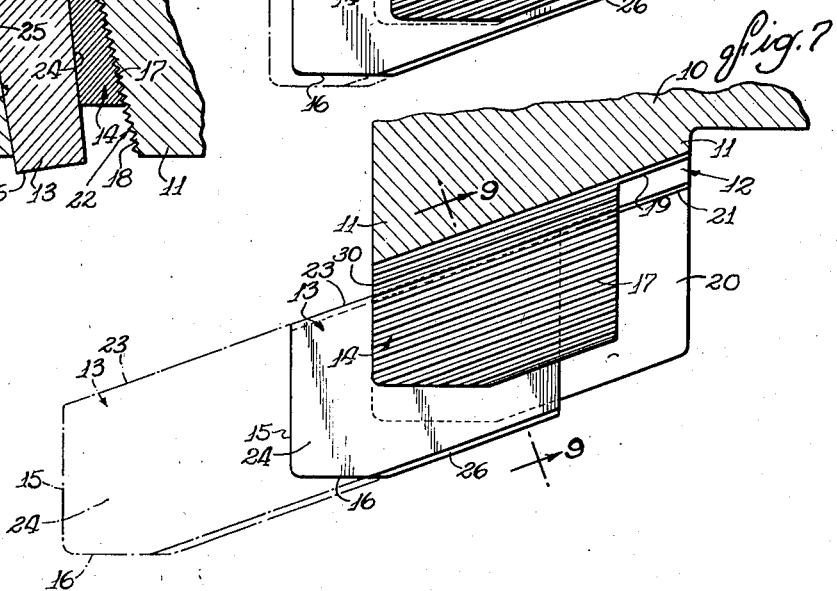
INVENTOR
Ralph R. Weddell
By Parker, Callen, Pitzner & Hubbard
ATTORNEYS Patented Jan. 2, 1940

2,185,487

UNITED STATES PATENT OFFICE 2,185,487

INSERTED BLADE CUTTER

Ralph R. Weddell, Rockford, Ill., assignor to The Ingersoll Milling Machine Company, Rockford, Ill., a corporation of Illinois Application December 18, 1936, Serial No. 116,533

16 Claims. (Cl. 29—105)

This invention relates to cutters of the so-called inserted blade type and has more particular reference to those in which provision is made for adjustment of the cutting edges in a plurality of directions of wear.

Some cutting materials, such for example as that sold under the trade name of "Stellite," are extremely difficult to machine. When such materials are used in cutter blades, it is desirable that the blade be made plane sided without grooves, undercuts, serrations, or the like in its side surfaces so that the blades may be shaped by simple grinding operations. On the other hand, such plane sided blades are more difficult to grip and therefore to mount with the desired rigidity in the cutter body.

The primary object of the present invention is to provide an inserted blade cutter having a new and improved blade mounting which permits the use of plane sided cutting blades but at the same time locks the blades firmly against dislocation under the forces encountered in service use.

Another object is to provide an improved blade mounting which permits a maximum amount of blade to be used and which locks the blade in place with the same degree of rigidity irrespective of the position to which the blade has been adjusted.

The invention also resides in the novel construction of the cutter blade itself.

Other objects and advantages of the invention will become apparent from the following detailed description taken in connection with the accompanying drawings, in which Figure 1 is a fragmentary perspective view of an inserted blade cutter embodying the present invention.

Fig. 2 is an enlarged partial plan view of the cutter shown in Fig. 1.

Fig. 3 is a perspective view of one of the blades.

Fig. 4 is a perspective view of one of the locking wedges.

Figs. 5, 6 and 7 are detail sectional views along the line 5—5 in Fig. 2 illustrating the relative positions of the blade and locking wedge for different longitudinal adjustments of the blade as the outer end thereof is worn away during operation.

Fig. 8 is a transverse sectional view along the line 8—8 in Fig. 5.

Fig. 9 is a transverse sectional view along the line 9—9 in Fig. 7.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the form selected for purposes of illustration, the invention is embodied in a so-called face milling cutter having a cylindrical body or blade holder 10 adapted to be mounted in the usual way for rotation about a centrally located axis. An axially facing peripheral flange 11 on the end of the body has formed therein a series of annularly spaced slots or blade openings 12 for receiving blades 13 which are locked in the body in different positions of longitudinal adjustment by means of wedges 14.

The slots, which extend at the usual shear angles relative to radii of the body, are open at opposite ends and at one side, and are defined in the present instance by a flat bottom wall 21 and opposed side walls 20 and 22 which are elongated in a radial direction and converge inwardly (see Fig. 2) from the outer end of the blade recess toward the cutter axis to produce a longitudinal taper. For a purpose to appear later, the side walls 20 and 22 also are formed with a transverse taper and therefore converge inwardly at a small angle indicated at 32 (Fig. 8).

Each of the blades 13 comprises an elongated generally rectangular block of cutting material, such for example as Stellite, having plane sides so that the blade, even when constructed of such hard material, may be shaped by simple machining operations such as grinding and therefore reduced to the desired dimensions at a low cost. Thus each blade comprises a flat bottom wall 23, opposite flat side walls 24 and 25, and a top wall 26. The end portion of each blade which projects beyond the outer open end of the recess 12 is formed in the usual manner with relieved surfaces 27 and 28 terminating in end and side cutting edges 15 and 16 on the leading side of the blade.

To enable each blade to be wedged against the bottom wall 21 and the adjacent side wall 20 of the blade recess, the surfaces 24 and 25 converge toward each other from the active end of the blade thereby forming a longitudinal taper as shown in Fig. 2. These side surfaces also converge relative to each other to form a transverse taper indicated at *a* in Fig. 8, the direction of convergence being outwardly and away from the bottom surface 21 in the present instance.

Outward adjustment of the cutting edges 15 and 16 is effected by sliding the blade outwardly along the bottom wall 21 of the blade recess which wall is inclined at the proper angle (see Figs. 5 to 7) to effect the desired proportionate set-out of the respective cutting edges. The angle at which the bottom wall 21 is disposed will vary according to whether the cutter is to be used for roughing or finishing. After the blades have been located in the proper positions of adjustment, they are locked in the cutter body by means of the wedges 14 which are adapted to be moved endwise into the narrow longitudinally and transversely tapering recess between the blade surface 25 and the opposed wall 22 of the blade recess. Herein each wedge comprises an elongated block of metal having opposite side surfaces which taper in a longitudinal direction as shown in Figs. 2 and 4, and also in a transverse direction as shown in Figs. 4 and 8. The direction of this transverse taper is reverse to that of the blades so that in the present instance the wedge in effect overlies the inclined surface 25 of the blade and thereby locks the blade positively against the bottom wall 21. The large corner of the wedge is preferably cut away to form a surface 29 so that the outermost end 30 of the wedge conforms generally to the cross sectional shape of the body flange 11.

To provide maximum lateral support for the projecting ends of the blades irrespective of the longitudinal positions of adjustment thereof, provision is made for changing the effective thickness of the wedges 14 so that the outermost ends 30 will, in the locked position of the parts, always be disposed at or closely adjacent the end of the blade recesses (see Fig. 2). In this way, each blade is rigidly backed as far out from the cutter axis on its trailing side as on the leading side. For this purpose, interfitting formations are provided on the wedge and the adjacent wall of the blade recess for enabling the wedge to be shifted toward and away from the bottom of the blade slot. The formations thus coact with the transverse taper of the wedge to enable the effective thickness of the latter to be changed and its final longitudinal position to be controlled. With the particular transverse tapers used herein, the blade will be set deeper in the blade recess as the blade is advanced outwardly to compensate for wear. In the present instance, the formations take the form of serrations 18 on the wall 22 and complemental serrations 17 on the wedge. These serrations extend longitudinally of the blade recess and the direction of entrance movement of the wedge and preferably are disposed parallel to the bottom wall 21 thereof.

From the foregoing, it will be observed that each blade and its wedge forms a combined element which tapers longitudinally and therefore may be driven into and firmly locked in the tapered blade recess. Because of its transverse taper and the provision of the interfitting serrations 17 and 18, the effective width of the wedge and therefore the distance it may be driven longitudinally into the tapered opening between the blade surface 25 and the opposed wall 22 may be varied as desired by advancing the wedge in and out step-by-step. Thus, with a new blade, the wedge would be set, in order to locate the end 30 at the outer periphery of the cutter body, with the outermost serrations in engagement with each other as shown in Figs. 5 and 8.

As the blade wears and is set out slightly, the wedge must be moved inwardly as shown in Fig. 6 in order to lock the blade. In this case, the wedge end 30 is still located adjacent the cutter periphery. When the blade is moved out still farther, however, it is desirable, in order to compensate for the decreasing thickness of the blade, to set the wedge in one serration at a time thereby maintaining the proper rigidity of the mounting. It will also be noted that the blade receiving slots, blades and wedges are all preferably provided with both longitudinal and transverse tapers. This double taper construction may be conveniently termed a compound taper.

From the foregoing, it will be observed that adjustment of a blade for wear is effected independently of the wedge, that is, by shifting the blade along the bottom of its slot. The wedge simply functions to lock the blade in its adjusted position and the serrations, coacting with the transverse taper of the wedge, function to compensate for changes in the effective width of the blade and wedge recess incident to wear adjustment of the blade. Through the medium of the serrations, which are self-contained within the wedge and cutter body, provision is made for adjustment of the blade to a relatively large number of different positions variably spaced from the bottom of the recess in the cutter body.

To increase the range of adjustment of the wedge and thereby enable the desired relation of the wedge and blade to be maintained, a slot 19 is cut in the cutter body along the bottom thereof on the wedge side thereof. This slot is wider than and therefore is adapted to receive the lower edge portion of the blade as shown in Fig. 9. Thus, even when the blade is worn down to the short length shown in Fig. 7, the wedge end 30 may still be located adjacent the outer end of the blade recess by shifting the wedge inwardly substantially to the bottom of the slot 19 as shown in Fig. 9. By virtue of this arrangement, a maximum length of the blade may be used without sacrificing rigidity of support for the blade.

The accuracy with which the wedge acts in compensating for changes in the effective width of the blade as the latter is adjusted for wear may be increased by forming the blade recess 12 as above described with a transverse inward taper indicated at 32 (Fig. 8). Due to this taper, it will be observed that for a given longitudinal position of the blade, the change in the longitudinal locked position of the wedge for a change of one serration in the transverse position of the wedge will be decreased. The use of an inward taper on the wedge is further advantageous in that the available chip clearance space in advance of each blade is not reduced as the blade is adjusted outwardly. In addition, greater strength of the cutter body is obtained for a given number of blades.

For the purpose of enabling the blades 13 to be used alternatively in cutter bodies adapted for clockwise and counter-clockwise rotation while at the same time providing for positive locking by the wedges 14 in the manner above described, the blades are formed with their side surfaces 24 and 25 symmetrical with their longitudinal center plane through the blades. That is to say, the angles indicated at a (Fig. 8) or the included angles between the bottom surface 23 and the side surfaces 24 and 25 of the blades are equal. With the blades thus constructed, the cutting blades 16 may be ground on either side and the blades used in holders having the serrations 18 formed on different side walls.

I claim as my invention:

1. A cutting tool comprising, in combination, a body having an inwardly tapering blade recess also tapering longitudinally from the open end thereof, a plane sided block of cutting material disposed in said recess with one side and edge surfaces thereof bearing against a side and the bottom walls of said recess, cutting edges on an end portion of said blade projecting from said open end of said recess, the opposite sides of said blade converging outwardly and also tapering longitudinally away from said cutting edges, a longitudinally tapering wedge inserted longitudinally of said blade between one side thereof and the opposed wall of said opening and acting to wedge the blade against said side and bottom walls, said wedge also being tapered transversely to permit of variations in the effective width of the wedge by selective positioning thereof transversely of the blade, and a series of interfitting formations on said wedge and the adjacent side wall of said recess for maintaining the selected transverse position of the wedge whereby to permit the outer end of said wedge to be disposed adjacent the edge of said body regardless of the longitudinal position of adjustment of said blade.

2. A cutting tool comprising, in combination, a body having a blade recess opening outwardly and tapering longitudinally from the open end thereof, a longitudinally and transversely tapered blade positioned in said recess with one side and the bottom surface thereof lying against a side and the bottom walls of said recess and with one end portion projecting from said open end, side and end cutting edges formed on said end portion, a longitudinally tapering wedge inserted in a direction longitudinally of said blade between the side thereof and the other side wall of said recess, said wedge being tapered transversely in a direction reverse to the transverse taper of said blade, complemental formations on said wedge and the adjacent side wall of said recess interfitting in different selected relative lateral positions of the blade and the wedge, and a slot in the bottom of said recess adapted to recess the narrow edge portion of said wedge and permit lowering of the wedge in said recess below the bottom of said blade.

3. A cutting tool comprising, in combination, a body having a blade recess open at one side and one end and tapering longitudinally from said end, a longitudinally and transversely tapered blade positioned in said recess with one side and the bottom surface thereof lying against a side and the bottom walls of said recess and with one end portion projecting from said open end, side and end cutting edges formed on said end portion, a longitudinally tapering wedge inserted in a direction longitudinally of said blade between the side thereof and the other side wall of said recess, said wedge being tapered transversely in a direction reverse to the transverse taper of said blade, and complemental formations on said wedge and the adjacent side wall of said recess interfitting in different relative lateral positions of the blade and the wedge to positively lock the wedge in said recess.

4. A cutting tool comprising, in combination, a body having a blade recess opening outwardly and tapering longitudinally from the open end thereof, a longitudinally and transversely tapered plane sided blade positioned in said recess with one side and the bottom surface thereof lying against a side and the bottom walls of said recess and with one end portion projecting from said open end, side and end cutting edges formed on said end portion, a longitudinally tapering wedge inserted in a direction longitudinally of said blade between the side wall of said recess, and the other side wall of said recess, and means for holding said wedge in different positions of lateral adjustment relative to said blade and said body and thereby permit location of the wedge in wedged position with one end disposed adjacent said open end of said recess irrespective of the longitudinal position of said blade.

5. A cutting tool comprising, in combination, a body having a blade opening therein tapering longitudinally from the open end thereof, a plane sided blade and a cooperating wedge removably positioned side by side in said opening and forming a combined element tapering longitudinally of said recess so as to wedge therein, said wedge being transversely tapered to vary the effective width thereof upon selective positioning of the wedge transversely with respect to the adjacent side wall of said blade, and a series of interfitting serrations on one side of said wedge and the adjacent wall of said opening extending longitudinally of the wedge and acting to maintain said wedge in its selected transverse position relative to the blade.

6. An inserted blade cutting tool comprising, in combination, a blade holder having a blade receiving slot therein tapering longitudinally from the open end thereof, a plane sided blade and a cooperating wedge removably positioned side-by-side in said slot and forming a combined element tapering in a longitudinal direction, said wedge and said blade being transversely tapered and disposed with the wider edge of said wedge at the open side of said slot and with the narrower edge of said blade at the open side of said slot, and said wedge and the adjacent side wall of said slot being provided with interfitting serrations extending in a generally longitudinal direction with respect to said wedge.

7. An inserted blade cutting tool comprising, in combination, a blade holder having a blade receiving slot therein, a plane sided blade and a cooperating wedge removably positioned side-by-side in said slot with one side and the bottom wall of said blade resting in direct face-to-face contact with the adjacent walls of said slot, said wedge having a compound taper, the transverse taper of said wedge serving to vary the effective width thereof upon selective positioning of the wedge transversely with respect to the adjacent side wall of said blade, and said wedge and the adjacent side wall of said slot being provided with interfitting serrations extending in the general direction of entrance movement of the wedge.

8. For use in a rotary cutter of the inserted blade type, a blade comprising an elongated block of cutting material having top and bottom surfaces and plane flat side surfaces, intersecting cutting edges formed along the top and end of said block and disposed in the plane of one of said side surfaces, said side surfaces converging at equal angles toward the longitudinal center plane of the block in a direction longitudinally of the block and away from said cutting edges, and said side surfaces also tapering in a direction away from said bottom surface and converging at equal angles toward said center plane thereby adapting the blade for use alternatively in cutters rotatable in opposite directions.

9. For use in rotary cutter of the inserted blade type, a cutter blade comprising an elongated block of cutting material having plane flat bottom and side surfaces, a cutting edge extending along one end of said block and disposed at an obtuse angle relative to said bottom surface, a second substantially straight cutting edge extending along the top of said block and disposed at an acute angle relative to said bottom surface, said side surfaces converging toward each other both longitudinally and transversely of said block and in directions respectively away from said cutting edges and from said bottom surface.

10. A cutting tool comprising, in combination, a body having a blade recess therein defined by opposed side walls and a bottom wall and being open at one end and along one side opposite said bottom wall, said side walls converging toward each other in a direction away from the open end of said recess, a plane sided blade tapered both longitudinally and transversely and seated in said recess against said bottom wall and one of said side walls with the larger end portion of the blade projecting from the open end of said recess, end and side cutting edges formed on said projecting end portion and adjustable outwardly independently of the blade clamp by endwise shifting of said blade outwardly from said body along said bottom wall, said blade and the other of said side walls defining a space within said recess extending along the blade and tapering longitudinally and also transversely, a wedge tapered both longitudinally and transversely of its length to fit said space and inserted endwise therein to clamp said blade against said bottom and said first mentioned side wall, said blade and wedge having smooth adjacent faces, and complemental serrations on the opposite face of the wedge and the adjacent wall of said recess extending generally longitudinally of the wedge and interfitting in different selected positions of adjustment of the wedge transversely of said space and said blade to compensate for reduction in the blade thickness incident to progressive outward adjustment of the blade and thereby permit of location of the wedge in wedged position with one end disposed near the open end of said recess irrespective of the longitudinal position of the blade.

11. A cutting tool comprising, in combination, a body having a blade recess therein defined by opposed side walls and an inclined bottom wall and being open at one end and along one side opposite said bottom wall, said side walls converging toward each other in a direction away from the open end of said recess, a blade tapered both longitudinally and transversely and seated in said recess against said bottom wall and one of said side walls with the larger end portion of the blade projecting from the open end of said recess, said larger end portion having end and side cutting edges formed thereon which are adjustable outwardly relative to said body by endwise shifting of said blade along said inclined bottom wall, said blade being of less width than the blade recess to leave an open space between one of its side faces and the adjacent side wall of said recess, which space tapers longitudinally and also transversely, a wedge tapered both longitudinally and transversely to fit in said space when inserted in a direction generally longitudinally of the blade and thereby clamp said blade against the opposite side wall of said recess, and interfitting rib and groove formations integral with the respective abutting faces of said wedge and recess wall, extending in a direction lengthwise of the entrance movement of the wedge and serving to lock the wedges in a multiplicity of selected positions variably spaced from the bottom of said recess.

12. A cutting tool comprising, in combination, a body having a blade recess therein defined by opposed side walls and a bottom wall and being open at one end and along one side opposite said bottom wall, said side walls converging toward each other in a direction away from the open end of said recess, a blade tapered both longitudinally and transversely and seated in said recess against said bottom wall and one of said side walls with the larger end portion of the blade projecting from the open end of said recess, said larger end portion having a cutting edge formed thereon, and said blade being of less width than the blade recess to leave an open space between one of its side faces and the other side wall of said recess, which space tapers longitudinally and also transversely, a wedge tapered both longitudinally and transversely to fit in said space when inserted in a direction generally longitudinally of the balde and thereby clamp said blade against the opposite side wall of said recess, and complemental serrations on said other side wall and the abutting face of said wedge extending in a direction lengthwise of the entrance movement of the wedge and interfitting in a series of selected transverse positions variably spaced from the bottom of said recess to compensate for reduction in blade thickness incident to progressive outward adjustment of the blade and thereby permit of location of the wedge in wedged position with one end disposed near the open end of said recess irrespective of the longitudinal position of the blade.

13. A cutting tool comprising, in combination, a body having an open ended blade recess tapering away from its open end, a tapered plane sided blade positioned in said recess with one side and the bottom surface thereof lying against a side and the bottom walls of said recess in all positions of adjustment of the blade and with one portion projecting from said open end, a cutting edge formed on said end portion, a tapering wedge inserted between the side thereof and the other side wall of said recess, and means rigid with said wedge and body and coacting to hold the wedge in a plurality of d'fferent positions of adjustment spaced transversely of the direction of entrance movement of the wedge and thereby permit location of the wedge in wedged position with one edge disposed adjacent said open end of said recess irrespective of the adjusted position of said blade.

14. A cutting tool comprising, in combination, a body having a blade recess therein tapering longitudinally from the open end thereof, a plane sided blade and a cooperating wedge removably positioned side by side in said recess and forming a combined element tapering longitudinally of sa'd recess so as to wedge therein, said wedge being transversely tapered to vary the effective width thereof upon selective positioning of the wedge toward and away from the bottom of said recess, and means attached to said wedge and a wall of said recess and coacting to maintain said wedge in a plurality of different selected positions relative to the blade and variably spaced from the bottom of said recess.

15. A cutting tool comprising, in combination, a body having a blade recess therein, a smooth sided blade tapered in two directions transversely of each other and seated in said recess against two walls thereof with a portion of the blade projecting from the recess, a cutting edge formed on the projecting portion and adjustable outwardly independently of the blade clamp by shifting of said blade along said walls, said blade and another wall of the recess defining a space tapering in two transverse directions, a wedge tapered in two transverse directions to fit said space and insertable therein to clamp said blade against said first mentioned walls, said blade and wedge having smooth adjacent faces, and complemental serrations on the opposite face of the wedge and the adjacent wall of said recess extending generally longitudinally of the direction of entrance movement of the wedge and interfitting in different selected positions of adjustment of the wedge transversely of said entrance movement to compensate for reduction in the blade thickness incident to progressive outward adjustment of the blade and the support of the blade by the wedge is substantially coextensive with said first mentioned walls irrespective of the adjusted position of the blade.

16. An inserted blade cutting tool, comprising, in combination, a blade holder having a tapered slot therein, a smooth sided blade having a cutting edge thereon and seated in said recess for adjustment along the walls thereof to change the position of said edge, a compoundly tapered wedge inserted between said blade and one wall of said slot to lock the blade in adjusted position, and formations on said last mentioned wall and the wedge interfitting in different positions of adjustment of the wedge transversely of its entrance movement and coacting with the one taper of the wedge to control the effective thickness of the wedge and therefore the extent of said entrance movement.

RALPH R. WEDDELL.